United States Patent [19]

Huang

[11] Patent Number: 5,573,558
[45] Date of Patent: *Nov. 12, 1996

[54] AUTOMATIC TRANSPLANTING SYSTEM

[76] Inventor: Barney K. Huang, 3332 Manor Ridge Dr., Raleigh, N.C. 27603

[*] Notice: The term of this patent shall not extend beyond the expiration date of Pat. No. 5,254,140.

[21] Appl. No.: 178,797

[22] Filed: Jan. 7, 1994

Related U.S. Application Data

[60] Continuation-in-part of Ser. No. 136,764, Oct. 15, 1993, abandoned, which is a division of Ser. No. 667,188, Mar. 11, 1991, Pat. No. 5,254,140.

[51] Int. Cl.$^6$ ................................................. A01G 9/08
[52] U.S. Cl. ................................................. 47/1.01
[58] Field of Search ........................... 47/1.01, 1 A, 1 M

[56] References Cited

U.S. PATENT DOCUMENTS

| | | | |
|---|---|---|---|
| 3,012,370 | 12/1961 | Lortz et al. | 47/901 |
| 4,106,414 | 8/1978 | Vastag | 111/1 |
| 4,926,583 | 5/1990 | Hamilton | 47/1.01 |
| 5,142,816 | 9/1992 | Tetenburg | 47/1.01 |
| 5,254,140 | 10/1993 | Huang | 47/1.01 |

Primary Examiner—Terry Lee Melius
Assistant Examiner—Joanne C. Downs
Attorney, Agent, or Firm—Rhodes, Coats & Bennett, L.L.P.

[57] ABSTRACT

The present invention entails a plant/plug growing tray and an automatic transplanting system which includes a tray with a plurality of individual plant/plug cells and a vacuum system that is operative to induce plants to a planting area or receptacle such as field or pots. The tray also serves as a plant supply cartridge for air-pruned plants/plugs so that they can be automatically removed from the tray bottom for fully automated transplanting, using a continuous, intermittent or impulse pneumatic system. In the embodiment disclosed herein the transplanting system has the capability of transferring a set of multi-plants/plugs simultaneously, and then to shift a supply tray to a subsequent position and then to transfer a second set of multi-plants/plugs. In addition, the plant transferring and transplanting of the present invention is specifically designed and adapted such that it can be utilized both in the dry or paddy field, and internally within a greenhouse.

14 Claims, 12 Drawing Sheets

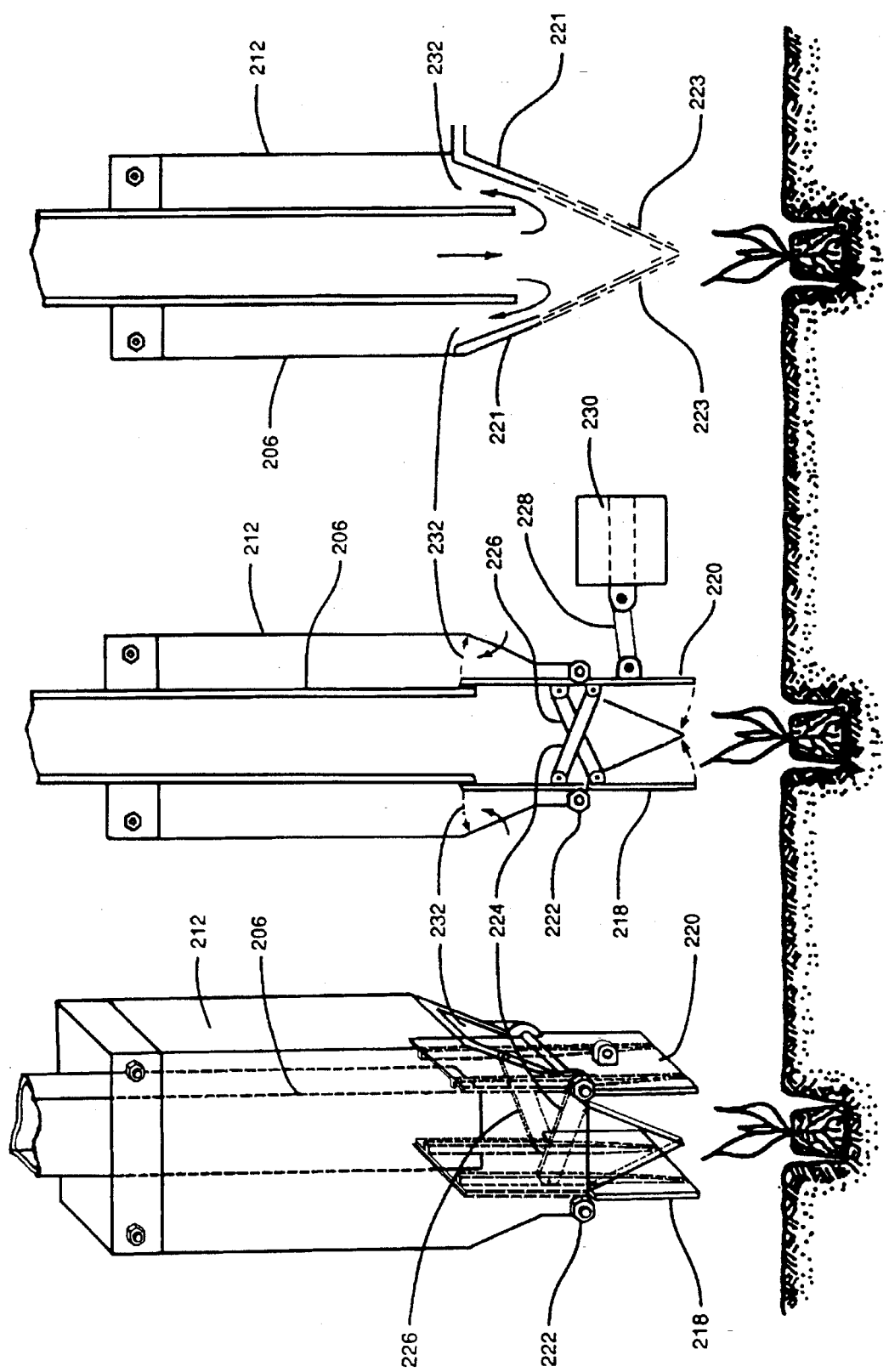

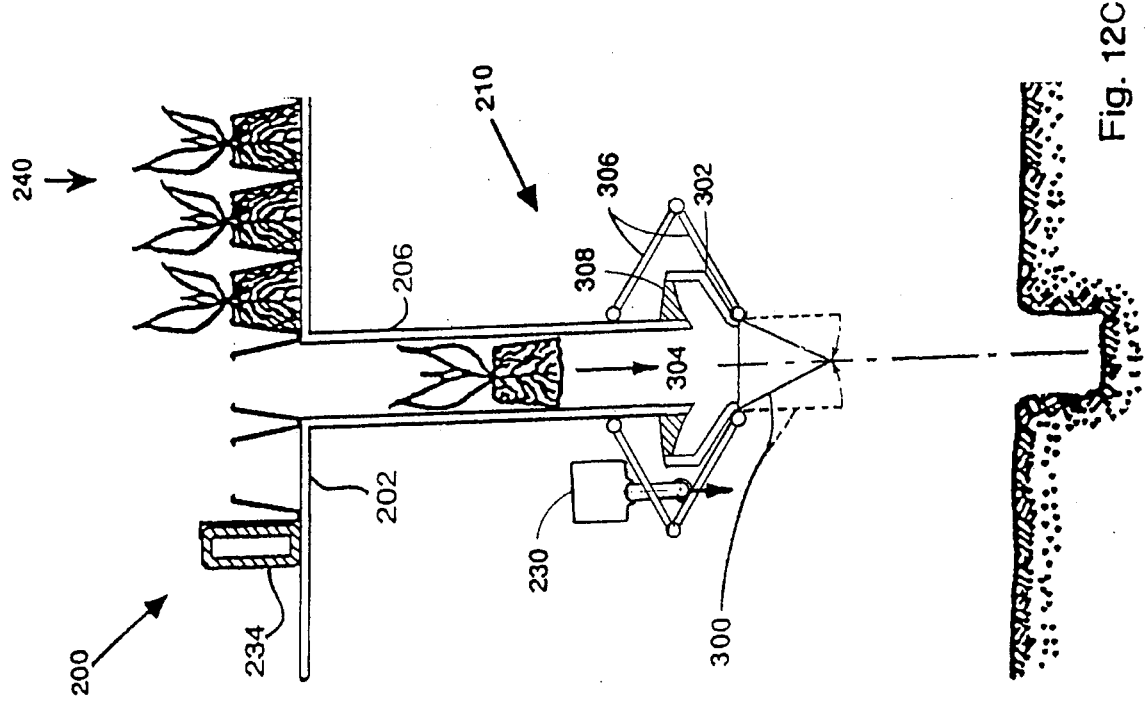
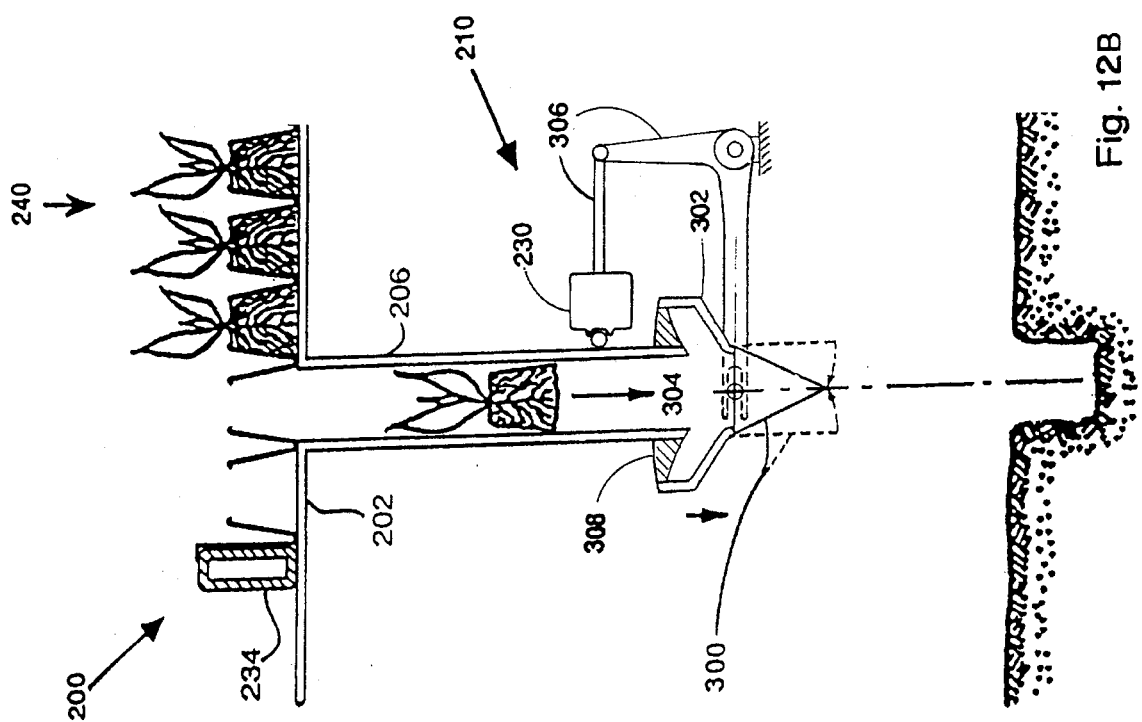

AUTOMATIC TRANSPLANTING SYSTEM

This is a Continuation-In-Part of U.S. patent application Ser. No. 08/136,764, filed Oct. 15, 1993, now abandoned which is a Divisional Application of U.S. patent application Ser. No. 07/667,188, filed Mar. 11, 1991, now U.S. Pat. No. 5,254,140.

FIELD OF THE INVENTION

The present invention relates to automatic transfer and transplanting of plants, seedlings, and plugs to increase production efficiency and to reduce the high labor requirement of transplanting to achieve automation of cultural and operational practices both in the field and greenhouse. It related more particularly to a multi-plant/plug vacuum induced plant transfer system for automatically transplanting one or more plants/plugs from a supply tray to the field or to a container.

BACKGROUND OF THE INVENTION

Mechanization and automation are as important for plant growers and nurserymen as it is for any other field of agriculture. This is because there is a tremendous amount of labor involved in the operation of a nursery, and the growers have to contend with the problems of scarcity of labor and overall labor costs just as any other business.

One particular labor intensive area is that of transferring or transplanting relatively young and small plants from their initial rooting container to a larger plant container or to the field for further growth and development. As in other fields of agriculture, a great deal of nurseries and plant producing facilities generally perform this operation by hand. Consequently, plant transfer and transplanting are time consuming and very inefficient. As a practical matter, the use of manual labor to transplant such plants severely limits the capacity of a farm or nursery for handling such transfer or transplanting operations.

Therefore, there is and continues to be, a need for a fully automatic plant transplanting system that will automatically transfer and transplant plants/plugs from an initial growing tray or container to a transfer area or second container for further growth and development in order to produce a superior plant in a greenhouse or in the field.

Numerous field tests indicate that air-pruned cuttings and seedlings are significantly superior in growth performance both in the trays and after transplanting and that effective fully automatic transplanting can be performed with the air-pruned seedlings for various crops.

SUMMARY AND OBJECTS OF THE INVENTION

The present invention entails a vacuum actuated automatic plant transfer and transplanting system for transferring or transplanting one or more plants/plugs at a time from a plant supply tray or cartridge to transfer areas such as the field ground or other container(s). Specifically, the plant transfer or transplanting system is operative to receive an open bottom supply tray having a plurality of plants/plugs therein, transplanting one or more plants/plugs at a time from the supply tray utilizing an impulse type vacuum force to remove plants/plugs from tray cells and eject them onto the ground or into plant containers.

It is therefore an object of the present invention to provide an automatic plant transfer and transplanting system for transplanting one or more plants/plugs from one container or a supply tray to a transfer area or second container.

Another object of the present invention resides in the provision of an automatic transplanting system that utilizes a vacuum chamber for inducing the movement of a plant/plug or a plurality of plants/plugs from a supply tray to the field or containers to achieve fully automated transplanting.

Another object of the present invention is to provide a plant transfer system for automatically transferring groups of plants/plugs from an open bottom supply tray by pneumatically pushing or pulling selected plants from and through the open bottom of the supply tray, using a continuous, intermittent or impulse vacuum system.

A further object of the present invention is to provide an automatic plant transfer and transplanting system of the matrix type where one group of plants forming a matrix within one or a group of supply trays is transferred and thereafter the entire supply tray or trays is sequentially shifted to a second position such that another like matrix of plants can be transferred and wherein this process is continued until the entire supply tray or trays are emptied.

Still a further object of the present invention is to provide an automatic plant transfer and transplanting system that is relatively simple in construction and which is reliable and easy to use.

Other objects and advantages of the present invention will become apparent and obvious from a study of the following description and the accompanying drawings which are merely illustrative of such invention.

BRIEF DESCRIPTION OF THE DRAWINGS

FIG. 6 illustrating the supply tray being moved one plant/plug cell increment to the left and the transfer of a second set of twenty-four (24) plants/plugs; FIG. 7 illustrating the supply tray being moved one plant/plug cell increment downwardly from the position shown in FIG. 6 and the transfer of a third set of twenty-four (24) plants/plugs; and finally FIG. 8 showing the supply tray being moved to the right one plant/plug cell increment from that shown in FIG. 7 to the right and the transfer of a fourth set of twenty-four (24) plants/plugs.

FIG. 9A is a fragmentary perspective view showing a portion of the drop tube, vacuum chamber, and door assembly of the plant transfer system shown in FIG. 9.

FIG. 9B is a sectional functional view of the structure shown in FIG. 9A with activating means.

FIG. 9c illustrates an alternate design for the plant transfer system of the present invention where the doors shown in FIGS. 9A and 9B are replaced by an air jet arrangement.

FIG 12A is a schematic illustration of the plant transfer and transplanting system of the present invention having an intermittent or impulse vacuum system with a reciprocating-cylinder and stationary piston.

FIG. 12B is a schematic illustration of the plant transfer and transplanting system of the present invention having an intermittent or impulse vacuum system with a reciprocating-cylinder with integrated elastic stationary piston with an actuating arm.

FIG. 12C is a schematic illustration of the plant transfer and transplanting system of the present invention having an intermittent or impulse vacuum system with a reciprocating-cylinder with integrated elastic stationary piston with an actuating linkage system.

DETAILED DESCRIPTION OF THE INVENTION

Figure 1:
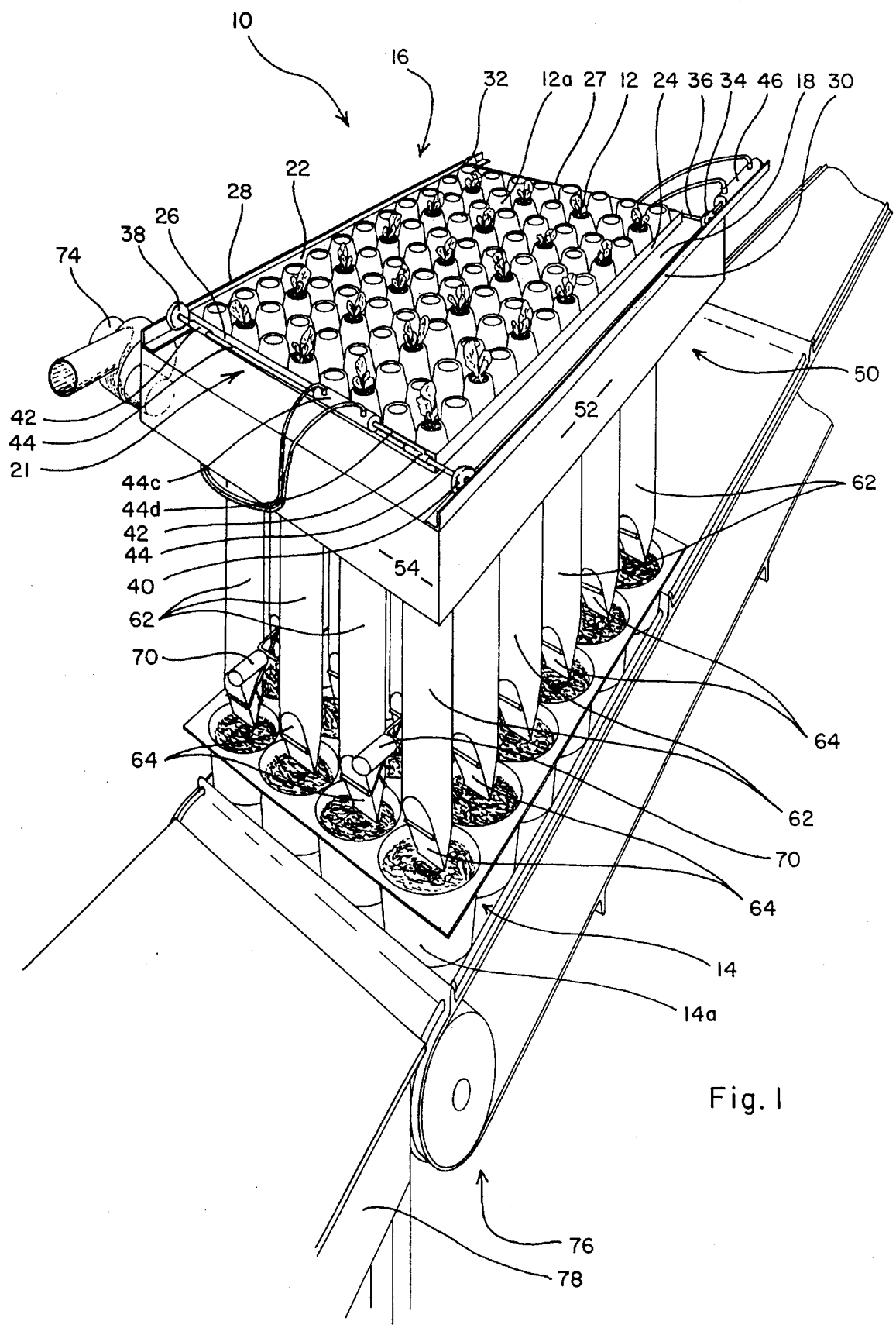
FIG. 1 is a perspective view of the plant transfer system of the present invention illustrating the transfer of plants/plugs from a supply tray to a series of individual pots forming a part of a part of a second tray.
Figure 2:
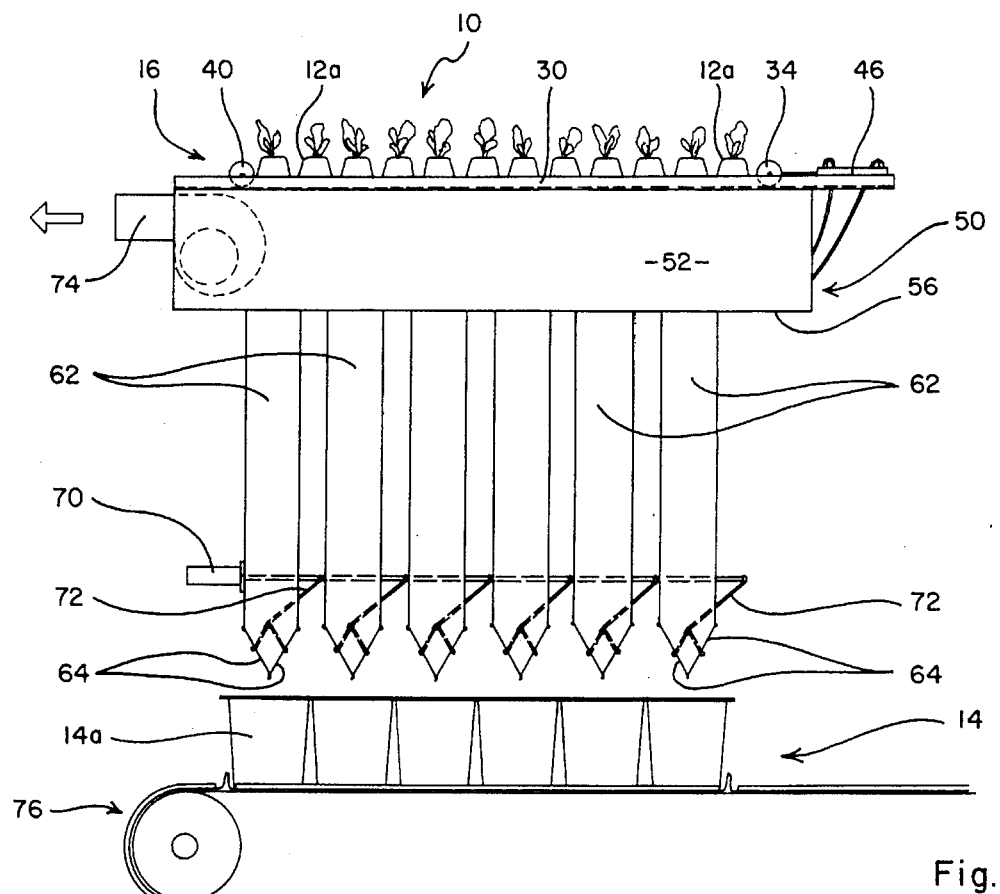
FIG. 2 is a side elevational view of the plant transfer system of the present invention.

With reference to the drawings, the plant transplanting system of the present invention is shown therein and indicated generally by the numeral 10 in FIG. 1 and 2. As will be appreciated from subsequent portions of this disclosure, the plant/plug supply tray 12 forms a part of the transplanting system designed to transfer one or more plants at a time from a supply tray to a receiving area such as pots, trays or a field environment.

The present transplanting system 10 is designed to receive a supply tray 12 that includes an open top and bottom and a plurality of aligned and uniformly spaced truncated pyramid or cone shaped plant cells 12a formed in the tray. Plant transfer system 10 is designed to transfer respective plants/plugs from supply tray 12 to plant receiving means. In the present disclosure the plant receiving means is illustrated by plant receptacle means 14 that could include a tray-type structure or a group of individually separated pots. Moreover, the receiving area could be a field environment.

Figure 3:
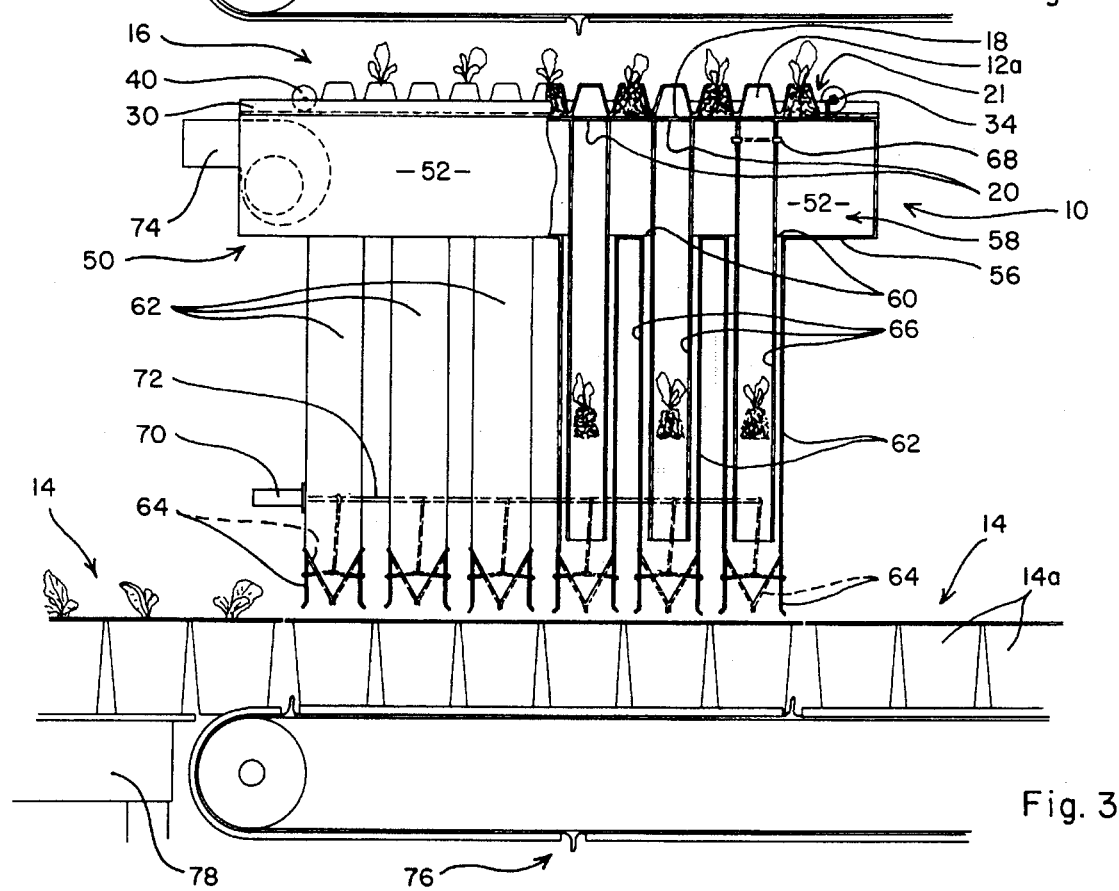
FIG. 3 is a side elevational view of the plant transfer system of the present invention with certain portions shown in sections to better illustrate internal structure of the plant transfer system.

Turning now to a discussion of plant transfer means 10, the same comprises a supply tray holding means indicated generally by the numeral 16. Supply tray holding means 16 comprises a flat bearing plate 18 that is designed to lie adjacent the bottom area of supply tray 12. Flat bearing surface 18 includes therein opening means 20 as shown in FIG. 3. Opening means 20 could include a single opening or a plurality of openings that are particularly spaced with respect to the individual cells 12a of the supply tray 12. This allows select cells 12a of the supply tray 12 to align with openings 20 when the supply tray assumes a selected position thereover. In any event, as will be understood and appreciated from subsequent portion of this disclosure, the function of the opening means 20 is to permit selected plants/plugs to pass therethrough as they are dislodged from the supply tray cells 12a.

Figure 4:
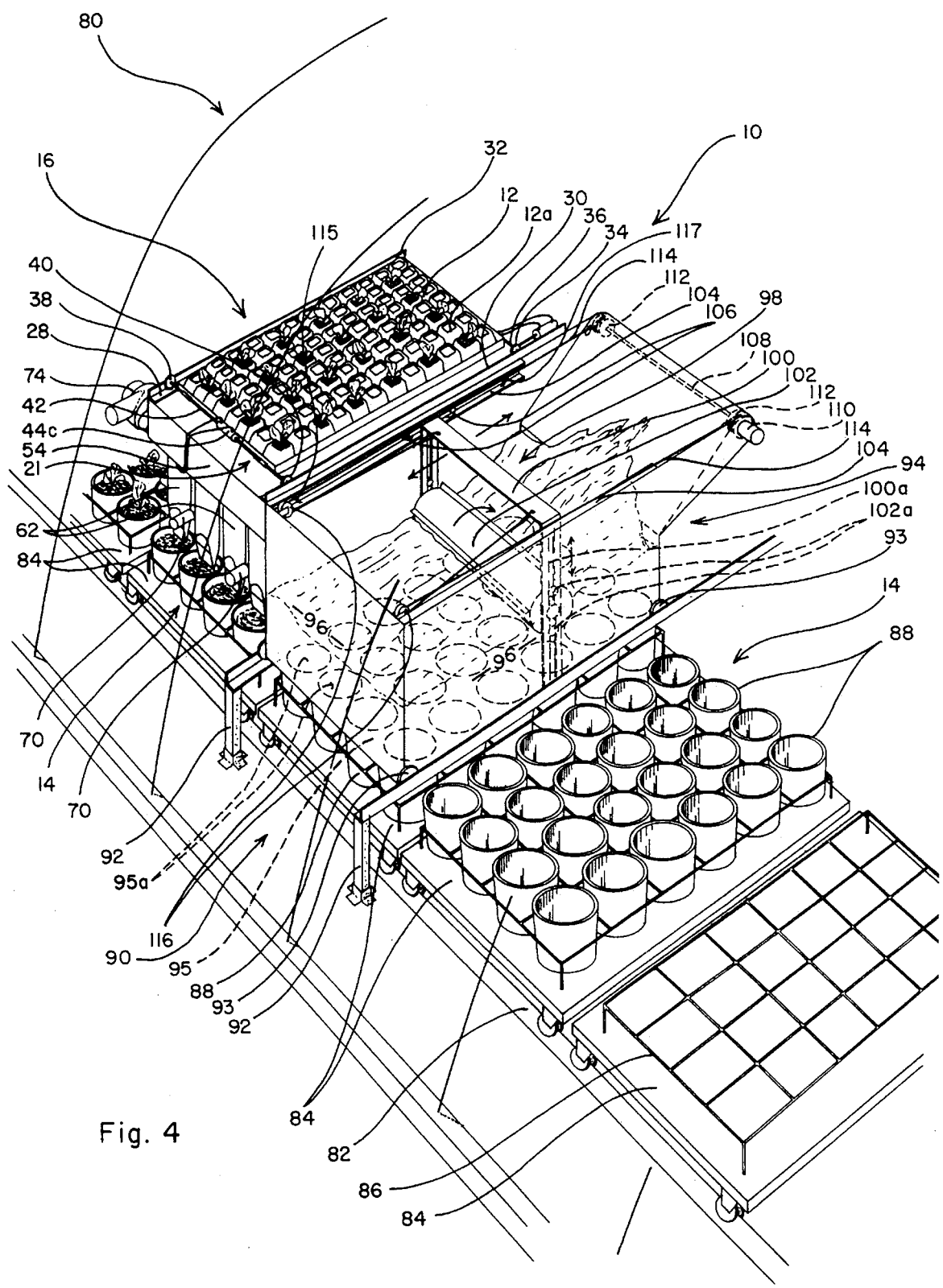
FIG. 4 is a perspective view of the plant transfer system with soil filling and conveyor system of the present invention shown utilized within a greenhouse.

To contain and control the supply tray 12, plant transfer system 10 comprises a X-Y type indexing frame indicated generally by the numeral 21 in FIGS. 1, 3 and 4. The frame is movable over the plant bearing plate 18 of the transplanter 10 for receiving and holding supply tray 12. Indexing frame 21 is movably mounted and can be indexed in both X and Y directions about bearing plate 18 using electrical, hydraulic, mechanical or pneumatic means. Bearing plate 18 forms the top of the common vacuum chamber 50 which includes side and end walls 52 and 54 and a bottom with a series of vacuum tubes 62. Disposed about the lower end of each vacuum tube is an openable and closable door assembly 64. As particularly illustrated in FIG. 3, there is a series of inner drop tubes 66 that communicate with the respective openings 20 formed in bearing plate 18 and which extend downwardly therefrom a select distance within the vacuum tubes 62.

The plant transfer system 10 of the present invention includes a door operating system for automatically opening in a selected time sequence the respective doors 64 secured about the terminal ends of vacuum tubes 62. Viewing the door opening system, it is seen that the same includes one or more sensors 68 (FIG. 3). In the case of the present disclosure, only one sensor 68 is shown, this being in a single inner drop tube 66. However, it is appreciated that if desired, each individual drop tube 66 could be provided with its own independent sensor 68. Sensor 68 would typically be of the photoelectric type and would effectively sense the passing of a dropping plant/plug.

Operatively connected to sensor 68 is a actuator 70. Actuator 70 could be of various types, but it is contemplated that in one preferable design embodiment actuator 70 would comprise a solenoid. Actuator 70 is operatively connected to a gang linkage assembly 72 which in turn is operatively connected to each of the door assemblies 64. It is noted in the drawings that there is a plurality of actuators 70 provided, each actuator being operatively connected to a gang linkage assembly 72 that actuates door assemblies 64 disposed along both sides of the gang linkage 72. Moreover, it is appreciated that the circuit interconnecting sensor 68 and actuator 70 may preferably include a conventional time delay device so as to time the opening of doors 64 with the dropping plants/plugs.

To generate a vacuum within the vacuum chamber 50, there is provided a continuous vacuum source 74 in the form of an electric motor and associated blower assembly.

Also forming a part of the plant transfer means of the present invention is a lower conveyor/table indexing means indicated generally by the numeral 76. It functions to transfer the respective plant receiving means 14 to an appropriate planting position under the vacuum tubes 62 where the transfer of plants actually takes place. It is appreciated that the conveyor/table means 76 would be operated in time relationship to the indexing frame 21. In this regard it should be appreciated that plant transfer system 10 of the present invention is designed so as to plant all of the underlying plant receiving means 14 at the same time with multi-tubes or one at a time with a X-Y type conveyor/ table under single vacuum tube or a movable single vacuum tube. Once the underlying plant receiving means 14 has been planted, then the conveyor/table means 76 is operative to advance those plants and associated containers from a planting position underneath the vacuum chamber 50 onto an adjacent table 78. After the planted containers have been moved from the planting position underneath the vacuum chamber 50, then the conveyor/table means 76 is operative to advance a next group of containers to the planting position underneath vacuum chamber 50.

Turning now to FIG. 4, the plant transplanting system of the present invention is shown therein disposed within a greenhouse structure indicated generally by the numeral 80. Greenhouse 80 is provided with a rail-type conveyor 82 designed to receive a series of mobile pallets 84. It is seen that in this embodiment that a pot grid 86 is provided on the respective mobil pallets 84. Next, a series of plant pots or containers 88 is inserted within the respective frames of the pot grid 86.

Forming a part of the plant transplanting system 10 of the present invention is a soil filling station, indicated generally by the numeral 90. Soil filling station 90 includes a bridge-type frame structure 92 that extends over the pair of conveyor rails 82.

Secured on frame structure 92 is a soil filling apparatus indicated generally by the numeral 94. Soil filling apparatus 94 includes a series of wheels 93 that allow the soil filling apparatus 94 to be moved from one location to another. In particular, it is contemplated that the soil filling apparatus 94 may be moved from on rail system to an adjacent rail system.

Viewing the automatic soil filling apparatus 94 in more detail, it is seen that the same comprises surrounding sidewall structure 96 and a bottom 95 having a series of openings 95a formed therein. The soil filling apparatus defines a container or hopper structure designed to receive soil mix or growth media. Soil packer assembly 98 is movably mounted within the hopper for longitudinal movement between extreme ends of the soil filling apparatus. Soil packer assembly 98 includes a U-shaped carrier frame 100 that is mounted within a pair of opposed longitudinal channels 104. Packer assembly 98 further includes a rotating cylindrical packer 102 that is provided with an internal drive motor that is designed to drive the same in the direction of the arrow shown in FIG. 4. U-shaped carrier frame 100 includes a vertical channel 100a in each leg and the packer cylinder 102 is mounted for adjustable vertical movement within those channels by a series of alignment wheels 102a.

The soil filling apparatus 94 is provided with means for driving the soil packer assembly 98 back and forth between extreme end positions of the soil filling apparatus 94. It should be noted that U-shaped carrier frame 100 includes a pair of wheels 106 secured to each side thereof with the respective wheels being confined within an elongated rail 104 secured to opposite sides of the soil filling apparatus 94. Thus, the entire soil packer assembly 98 can move back and forth within rails 104.

As noted above, the cylindrical packer 102 includes an internal power means for rotating the packer cylinder in the direction of the arrow shown in FIG. 4. Therefore, this rotation alone will cause the soil packer assembly to move from left to right as viewed in FIG. 4. To power the soil packer assembly from right to left, there is provided a cable drive assembly. As seen in FIG. 4, there is provided a rotating shaft 108 that is rotatively journaled and powered by motor 110. Secured to opposite ends of shaft 108 is a pair of pulleys 112. Secured to pulleys 112 is a pair of cables 114 that extend from the respective pulleys 112 to the opposite end of the soil filling apparatus 94 where they are trained around a pair of idler pulleys 116 after which the terminal end of the cables 114 extend back to and connect to the U-shaped carrier frame 100. Therefore, it is appreciated that as shaft 108 is rotated clockwise as viewed in FIG. 4, this rotation results in the carrier frame 100 and soil packer assembly 98 moving right to left as viewed in FIG. 4.

To control this movement, the soil filling apparatus is provided with a pair of switches 115 and 117 secured adjacent to the rail structure 104. Both switches 115 and 117 are operatively connected to the motor 110. Switch 115, located to the leftmost side as viewed in FIG. 4. When U-shaped carrier frame 100 engages switch 115 motor 110 is shut off. The rotating energy of the packer assembly 98 will alone move the same from left to right as viewed in FIG. 4. On the other hand, when the carrier frame 100 engages switch 117, motor 110 is turned on and as a result the entire soil packing assembly 98 is caused to move from right to left.

Figure 5:
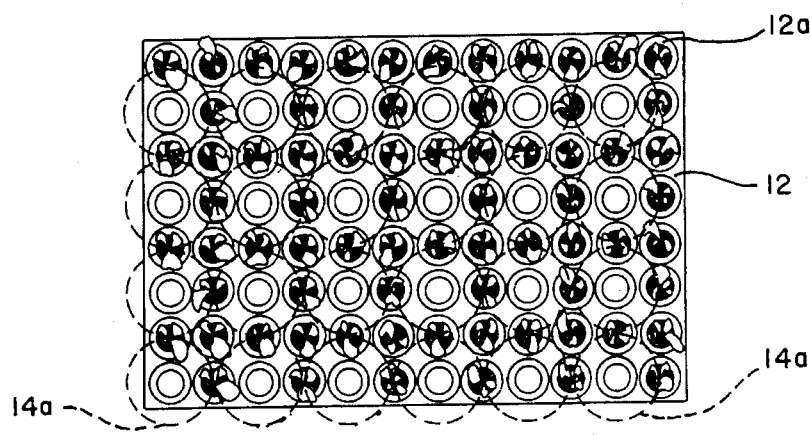
FIG. 5 through FIG. 8 are a sequence of views illustrating a series of matrix plant transfers from a supply tray to an underlying receiving tray with FIG. 5 illustrating the transfer of a first set of twenty-four (24) plants/plugs to the underlying receiving tray.
Figure 6:
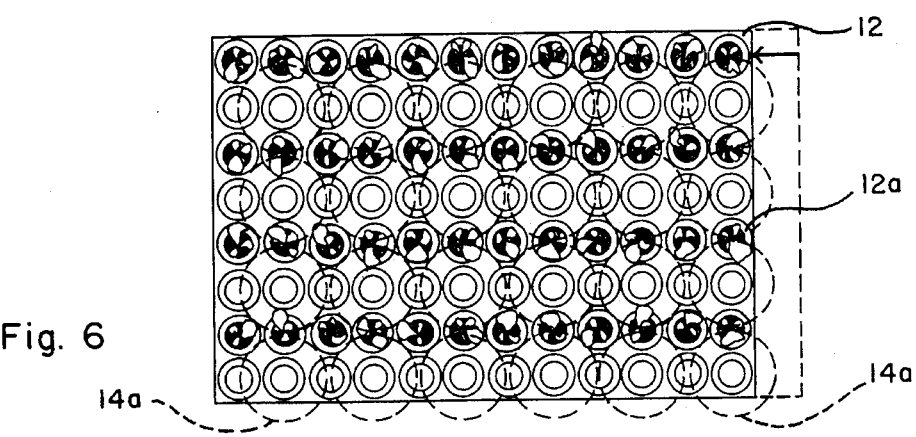
Figure 7:
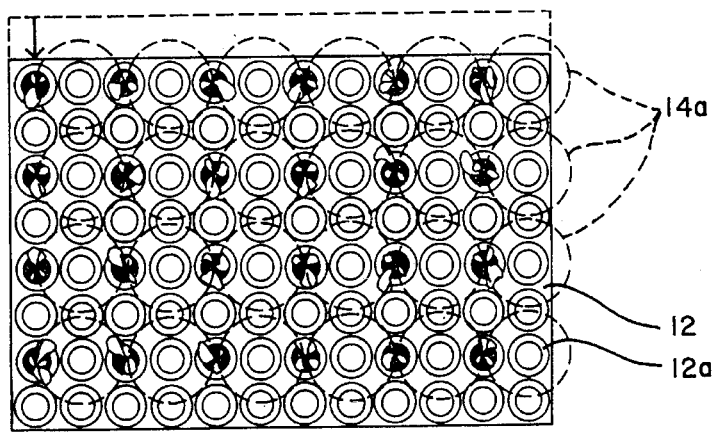

Turning to the operation of the plant transfer system 10 of the present invention, reference is first made to FIGS. 5 through 8. For the sake of explanation, supply tray 12 is provided with ninety-six (96) plant cells and the plant transfer system 10 is designed to transfer twenty-four (24) plants at a time. Thus, as viewed in FIG. 5, supply tray 12 assumes a first position. In that position, a selected matrix of twenty-four (24) plants overlies twenty-four (24) openings provided within bearing plate 18 above the vacuum chamber 50. The plant cells overlying the twenty-four (24) openings 20 within bearing plate 18 are aligned with twenty-four (24) larger receiving pots 14a, as illustrated in FIG. 5. Once in this first position, the vacuum device is actuated causing all twenty-four (24) overlying plants to be pulled from the supply tray 12 and directed into the twenty-four (24) underlying pots 14a.

Referring to FIG. 3, the actual transfer of the respective plants/plugs will be described. In this regard, the vacuum chamber 50 induces respective plants/plugs from the supply tray 12. The presence of the generated vacuum within chamber 50 results in the respective plants/plugs overlying openings 20 in bearing plate 18 being "sucked" downwardly through the respective drop tubes 66. As the potted plants move down the respective drop tubes 66, sensor 68 is actuated and through an appropriate time delay device actuator 70 is actuated resulting in the respective gang linkages 72 being appropriately actuated which in turn results in the respective door assembly 64 being open. The falling plants/plugs move through the respective doors 64 and are directed into the underlying receiving containers 14a. After the respective plants/plugs move past the door 64, the same are closed by a spring or by an appropriate conventional timing circuit associated with actuators 70.

At this point, the conveyor means 76 is actuated to move the planted underling containers 14a onto an adjacent table 78 and to convey and another set of containers into the planting position that is defined underneath vacuum chamber 50.

FIG. 5 shows the twenty-four (24) empty cells, each empty cell representing the transfer on a single plant from the supply tray 12 into an underlying aligned receiving container 14a.

To continue the transfer of plants, supply tray holding means 16 is actuated so as to move the entire tray 12 one plant or plant cell increment to the left as illustrated in FIG.

Figure 8:
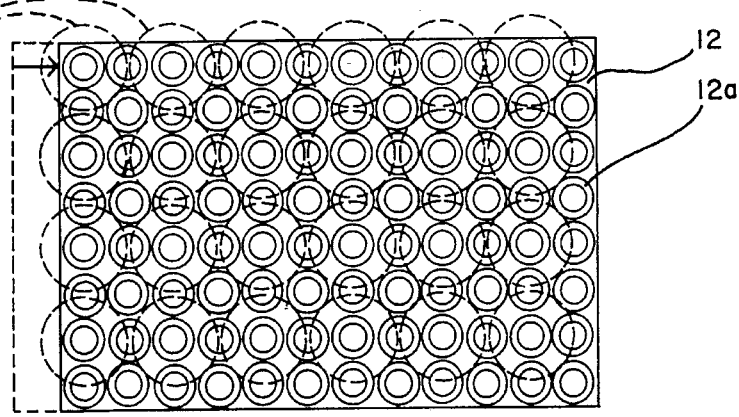

6. This allows twenty-four (24) additional plants to be appropriately aligned over the respective openings 20 within bearing plate 18 that overlies vacuum tubes 62. By the same process described herein above, a second set of twenty-four (24) plants/plugs are directed into the set of twenty-four (24) containers 14a that underlie vacuum tubes 62. After this, the indexing frame or the supply tray holding means 16 is again actuated and is moved one plant cell increment downwardly to the position illustrated in FIG. 7. There a third set of twenty-four (24) plants/plugs are appropriately aligned over the twenty-four (24) vacuum tubes 62 for transfer. Finally, after the transfer of the third set of twenty-four (24) plants/plugs, the indexing frame or the plant supply tray holding means 16 is actuated again and moved one plant cell increment to the right, as illustrated in FIG. 8. In this position, the final or fourth set of twenty-four (24) plants/plugs are appropriately aligned for transfer to underlying plant containers 14a.

Once this final set of twenty-four (24) plants/plugs has been transferred, then the empty plant tray 12 is removed from the indexing frame or the supply tray holding means 16 and a new loaded plant tray 12 is placed within the indexing frame or the supply tray holding means 16.

It should be appreciated that the plant transfer and transplanting system of the present invention can be adapted to accommodate various size plant trays with varying numbers of plant cells formed therein.

Figure 9:
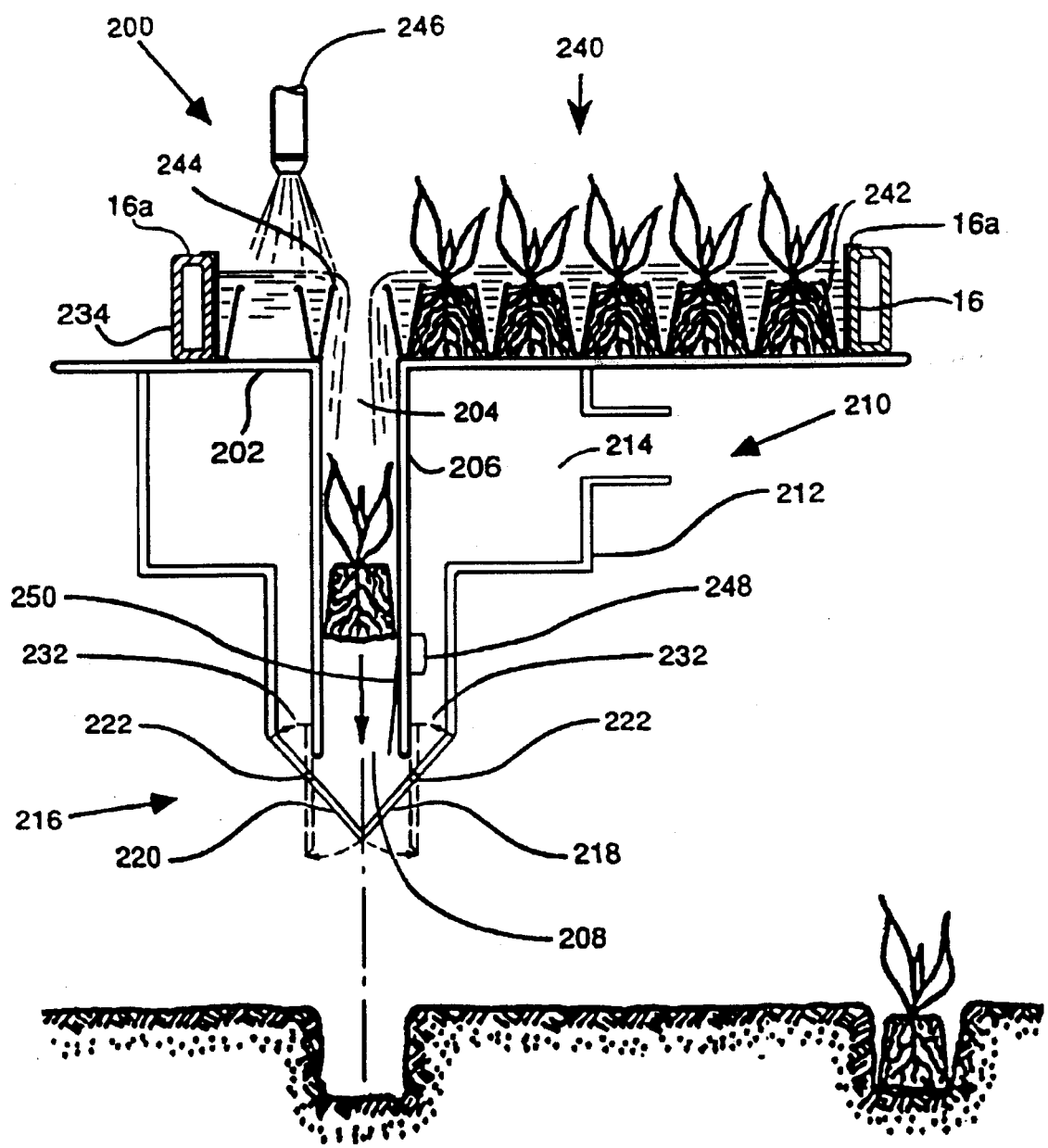
FIG. 9 is a schematic illustration of an alternative plant transfer system of the present invention.

With reference to FIG. 9, an alternate design for a plant transplanting system is shown therein and also indicated generally by the numeral 200. As will be understood from subsequent portions of this disclosure, the alternative plant transplanting system 200 is designed to simultaneously transfer both the plant and water at one time to a planting area and is designed for use in a field transplanting operation, pot planting operation, or any other type of planting operation. The system also includes a bearing plate 202 that is provided with one or multiple plant drop opening 204. One or multiple drop tubes 206 extend downwardly from the opening 204 and acts to direct a dropping plant into a planting area or planting cavity. Drop tube 206 includes an outlet end 208 through which the dropping plant passes.

Extending around the lower portion of drop tube 206 and communicatively open to the outlet 208 of the drop tube is a vacuum system indicated generally by the numeral 210. Vacuum system 210 includes a surrounding wall structure 212 that forms an internal vacuum chamber 214. Vacuum chamber 214 maybe opened and closed about the area surrounding the drop tube outlet 208 by a door assembly 216. As shown in FIGS. 9, 9A and 9B, door assembly 216 includes a pair of cooperating pivotally mounted doors 218 and 220. Each door 218 and 220 is pivotally mounted about a pivot axis 222. In order that the doors 218 and 220 can be simultaneously opened and closed together, there is provided a pair of pivotally connected cross links 224 and 226 that extend between opposite edges of the doors 218 and 220.

As seen in the drawings, when the respective doors 218 and 220 assume an open vertical position there is defined an air opening 232 between the upper portion of the respective doors and the adjacent portion of the wall structure 212 forming the vacuum system 210. Also, it is appreciated that in the open vertical position the upper portion of the doors 218 and 220 abut against and are stopped by the lower portion of the drop tube 206.

A switch actuator 250 or other sensing means such as photo sensors, pressure sensors, etc. is secured within the interior plant drop tube 206 and operatively connected to a micro-switch 248 that is wired to a solenoid 230 that is connected to at least one door through a pull arm or connecting arm 228. As a dropping plant/plug passes through drop tube 206, it activates the sensor which in turn actuate solenoid 230 to open the doors 218 and 220 to let the plant/plug passes through. It is appreciated that the doors could be provided with springs to maintain them in a closed position. But it is appreciated from FIGS. 9, 9A and 9B that the differential pressure acting on the doors would tend to bias or maintain the doors in a closed position because of the greater surface area disposed below the pivot axis 222 of the respective doors. That is, the atmospheric pressure acting on the doors 218 and 220 would tend to urge the doors to a closed position.

It is appreciated that in lieu of the doors 218 and 220, there could be provided a high pressure air jet curtain that would be directed downwardly and inwardly around the drop tube 206 near the opening 208. This air curtain would effectively seal the system plus it would aid in strengthening suction due to curtain action directing and inducing the plant/plug and water downwardly into the planting area. With reference to FIG. 9C, the plant transfer system of the present invention is shown with a high pressure air jet 221 that is operative to form an air curtain 223. It is appreciated that with this design there would not be a requirement for the cooperating doors.

Figure 10:
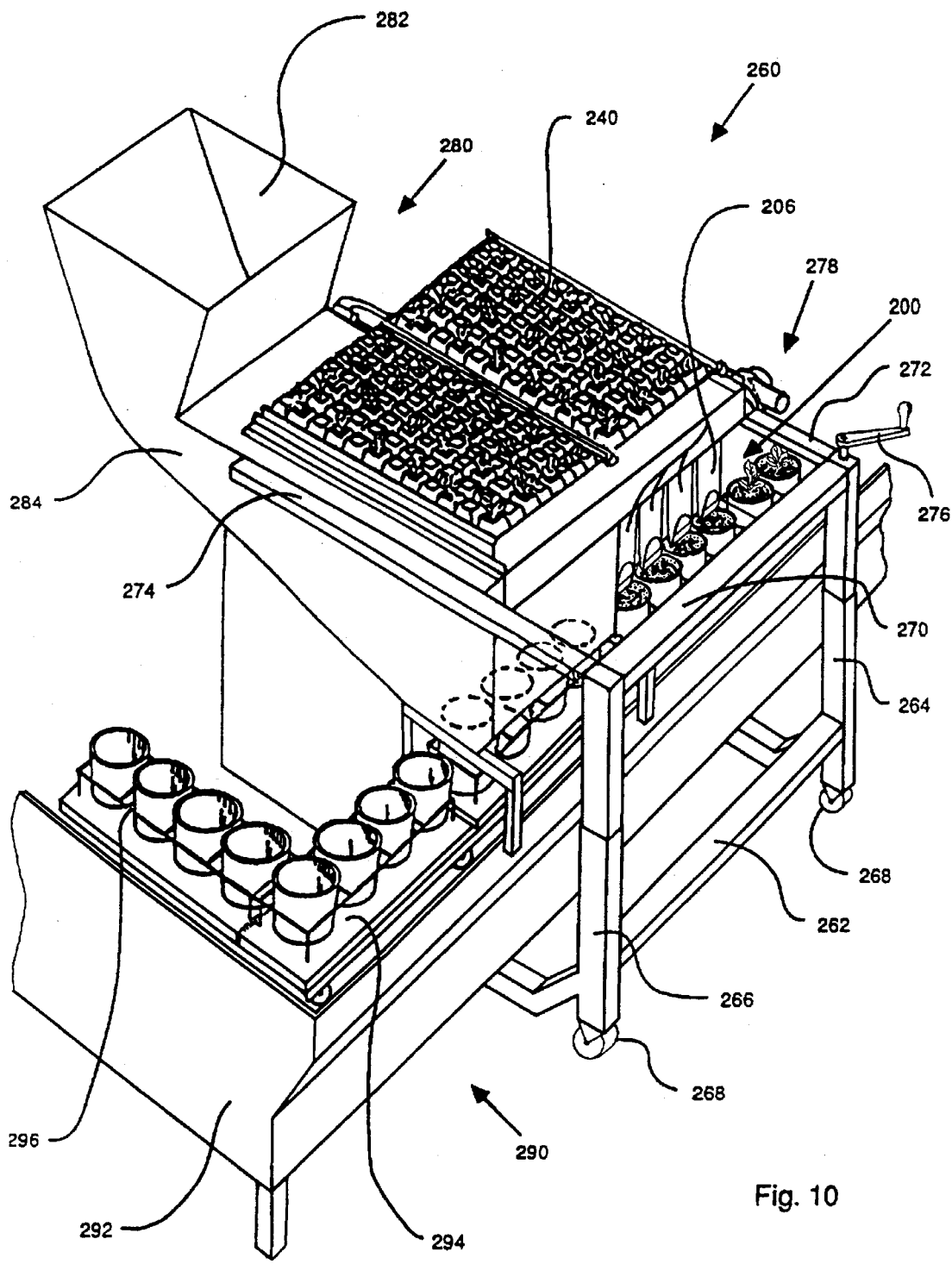
FIG. 10 is a perspective view of an automatic pot or flat transplanting system.

Turning to FIG. 10, there is shown therein a pot planting system 260 which is adapted to fill pots with a plant growing medium and also to plant plants within the pots in accordance with the plant transfer system shown in FIGS. 9, 9A, 9B and 9C. Turning to a discussion of the pot planting system 260, it is seen that the same includes a mobile main frame structure that is provided with a lower support 262 that supports a pair of upright lower posts 264 and 266. Posts 264 and 266 include wheels 268 that make the frame structure movable and portable. Connected to posts 264 and 266 is a telescoping upper U-shaped frame structure 270. A pair of laterally spaced arms 272 and 274 are secured to the U-shaped frame 270 and project outwardly therefrom, as shown in FIG. 10. There is provided a height adjustment mechanism 276 that permits upper U-shaped frame 270 to be adjusted vertically up and down.

Carried by arm 272 and 274 is a tray carriage 278. Details of the tray carriage 278 are not dealt with here in detail because such structures are known and as will be appreciated by those skilled in the art, the tray carriage is adapted to move fore and aft as well as side-to-side so as to align specific plants disposed within trays 240 with one or more outlet openings such as the opening 204 forming a part of the plant transfer system of FIG. 9. Disposed below the tray carriage 278 is a plant transfer system indicated generally by the numeral 200. The plant transfer system 200 is not shown in detail in FIG. 10 but the same includes a plurality of drop tubes 206 with the drop tubes and plant transfer system being of the type disclosed in FIG. 9.

Disposed adjacent the tray carriage 278 is a hopper indicated generally by the numeral 280. Hopper 280 includes an upper opening 282 and a wall structure 284. Hopper 280 serves to channel and direct a plant growing medium such as soil, peat moss, etc., downwardly into planting pots that are to receive plants from the plant trays 240.

As shown in FIG. 10, there is provided as a part of the pot planting system 260 of the present invention, a pot conveying system indicated generally by the numeral 290. Pot conveying system 290 includes a frame structure 292 for supporting a conveyor 294 that is designed to receive and convey plant pots through the pot planting system. As seen in FIG. 10, the conveyor system includes a grate structure 296 for retaining and holding the various pots on the conveyor 294.

As seen in FIG. 10, the pots are first conveyed underneath the hopper 280 where through a conventional pot filling process the respective pots are filled with a selected plant growing medium such as soil, peat moss, etc. Once the pots have been filled with a plant growing medium they are conveyed sequentially underneath the series of drop tubes 206 that form a part of the plant transfer system such as that shown in FIGS. 9, 9A, 9B and 9C. In the manner described with respect to the system shown in FIGS. 3 and 9, plants/plugs are induced from the respective plant tray cells and pass through the respective drop tubes 66 or 206 to where the plants/plugs are received by the pots or containers. Once the plants/plugs have been directed into the respective pots or containers, the respective pots are transferred to a collecting, storage or packing area.

Turning to the suction system, it is appreciated that the suction system could be continuous or intermittent. In an continuous vacuum arrangement an air blower or suction pump can be used. In an intermittent vacuum arrangement, a reciprocating piston or cylinder, a diaphragm within a cylinder, and a shutter to intermittently disrupt continuous vacuum can be used to generate impulses of vacuum and these intermittent pulses of vacuum would be operative to induce plants/plugs downwardly from the plant tray 240 through the drop tube 206.

Figure 11:
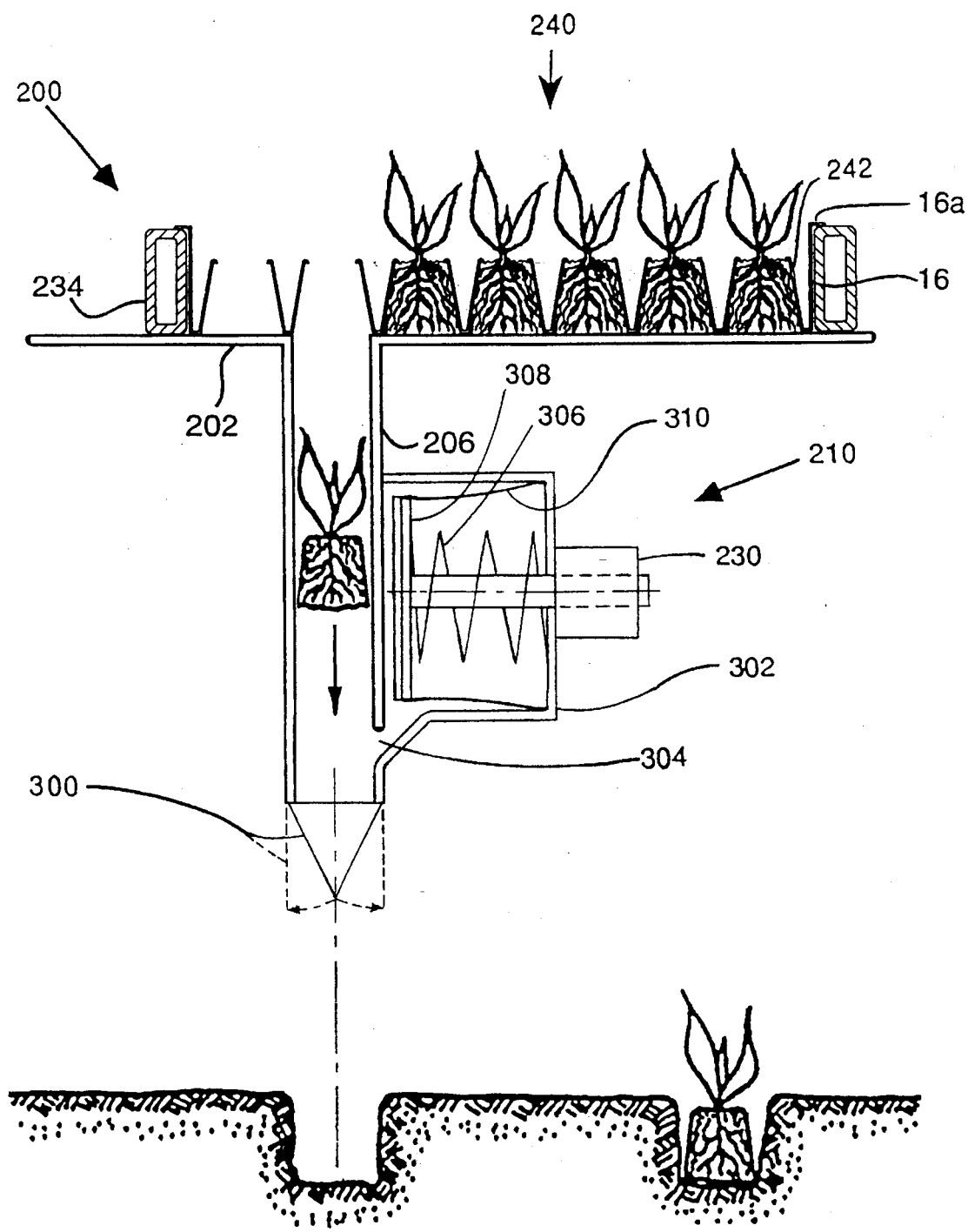
FIG. 11 is a schematic illustration of the plant transfer and transplanting system of the present invention having an intermittent or impulse vacuum system with a diaphragm.

Turning to FIG. 11, there is shown therein an intermittent or impulse vacuum arrangement and particularly a reciprocating piston-diaphragm type vacuum system. With respect to this embodiment, it is noted that the disclosure is essentially the same as other plant transfer designs shown and disclosed herein. The basic difference between the embodiment shown in FIG. 11 and the other plant transfer systems disclosed herein is that the design of FIG. 11 does incorporate a reciprocating piston or diaphragm-type impulse vacuum system.

Before looking at the vacuum system in more detail, it is noted that the design of FIG. 11 does incorporate a plant drop tube 206 that is designed to extend from a plant tray bearing surface 202. As shown in FIG. 11, a plant tray 240 is disposed on the plant tray bearing surface 202 and moves there across so that respective plant tray cells 242 align with the drop tube 206. Details of this basic arrangement have already been disclosed herein.

Formed about the lower remote end of the drop tube 206 is a flexible door arrangement indicated by the reference numeral 300. This door design can be constructed of resilient material, plastic of any other suitable material that will close tight as the piston or diaphragm is activated to cause vacuum. This impulse type vacuum will instantly pull down the seedling and the weight and inertia of the plant will cause the plant to shoot through the door 300 to make the transplanting.

Now turning to the impulse type vacuum system shown in FIG. 11, it is seen that the same includes a housing 302 that is secured to the drop tube 206 about the lower portion of the drop tube. The inside of the housing 302 is open to the interior of the drop tube 206 by an opening 304. This permits the vacuum system to draw a vacuum within the drop tube 206. Reciprocally mounted within the housing 302 is a piston assembly indicated generally by the numeral 210. The piston assembly 210 includes a piston plate 308 and a diaphragm 310 that is secured to the piston plate 308 and extends therefrom to where an end or edge portion of the diaphragm is connected to the wall structure of the housing 302 to form an airtight assembly in the front portion of the piston as shown in FIG. 11. A mechanical actuating device, air cylinder, or electric solenoid 230 is mounted at the end of housing 302 and is connected to the piston plate 308. Also a spring 306 is connected between the piston plate 308 and the back of housing 302 and acts to bias the piston plate 308 to an extended position. The housing 302 can be mounted vertically onto the drop tube 206 for gravitational return of piston plate 308 to eliminate the need of the spring 306. It is appreciated that the solenoid will be actuated in a synchronized time relationship with the movement of the plant tray 240 that is disposed over the drop tube 206. Essentially, just prior to the dropping of a plant, the piston assembly 210 is actuated to create a vacuum within housing 302 and the interior of the drop tube 206 which effectively causes the plant to be pulled or induced downwardly from the tray cell 242, through the drop tube 206 and through the door structure 300. Once the next succeeding tray cell 242 is properly aligned over the drop tube 206 and the plant transfer system is ready to dispense another plant, the impulse vacuum system 210 of FIG. 11 is once again actuated so as to induce another plant downwardly through the plant drop tube 206. It is appreciated that various piston type designs (or continuous vacuum designs) can be incorporated to yield an intermittent or impulse vacuum producing arrangement.

Figure 12:
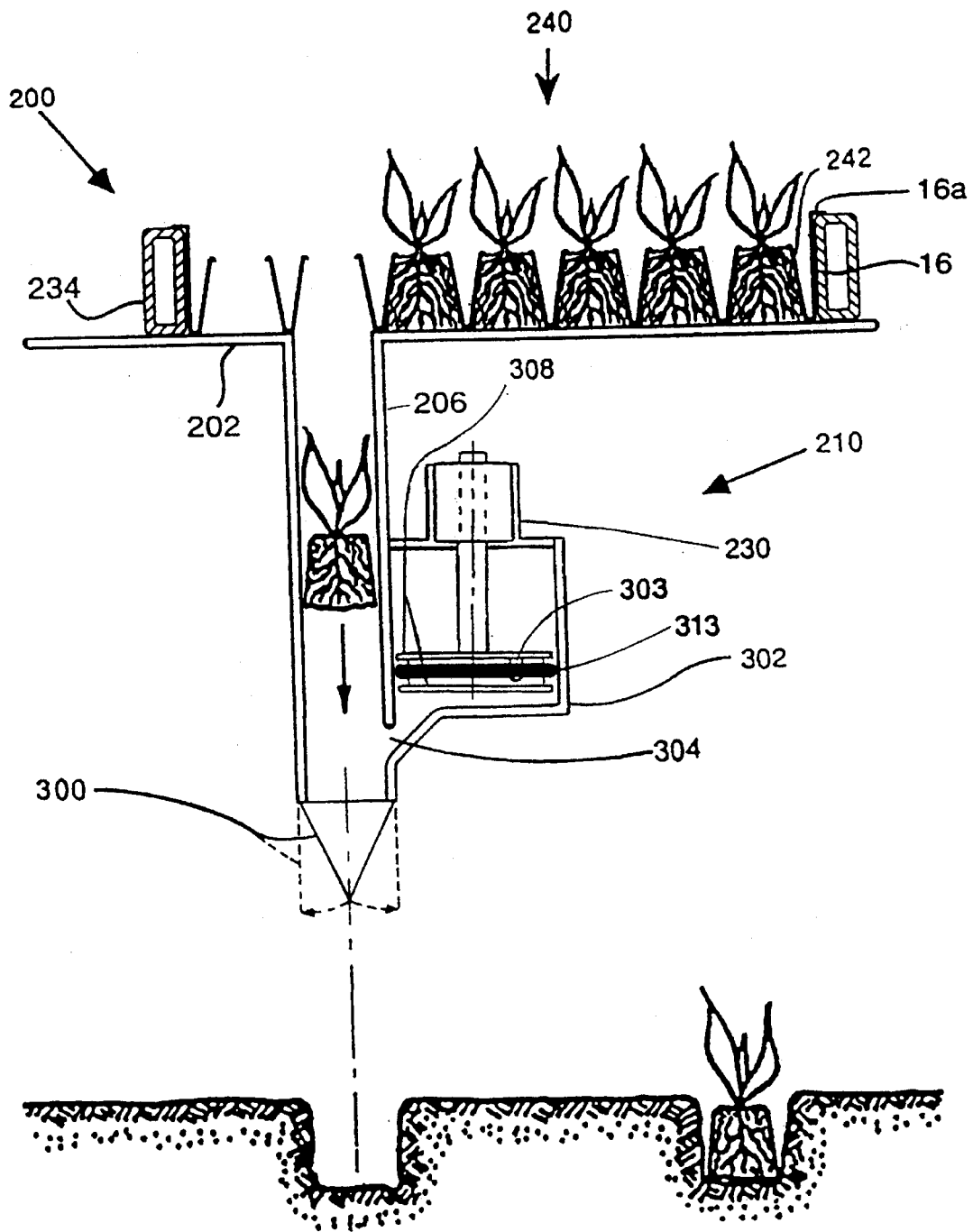
FIG. 12 is a schematic illustration of the plant transfer and transplanting system of the present invention having an intermittent or impulse vacuum system with an O-ring piston.
Figure 12:
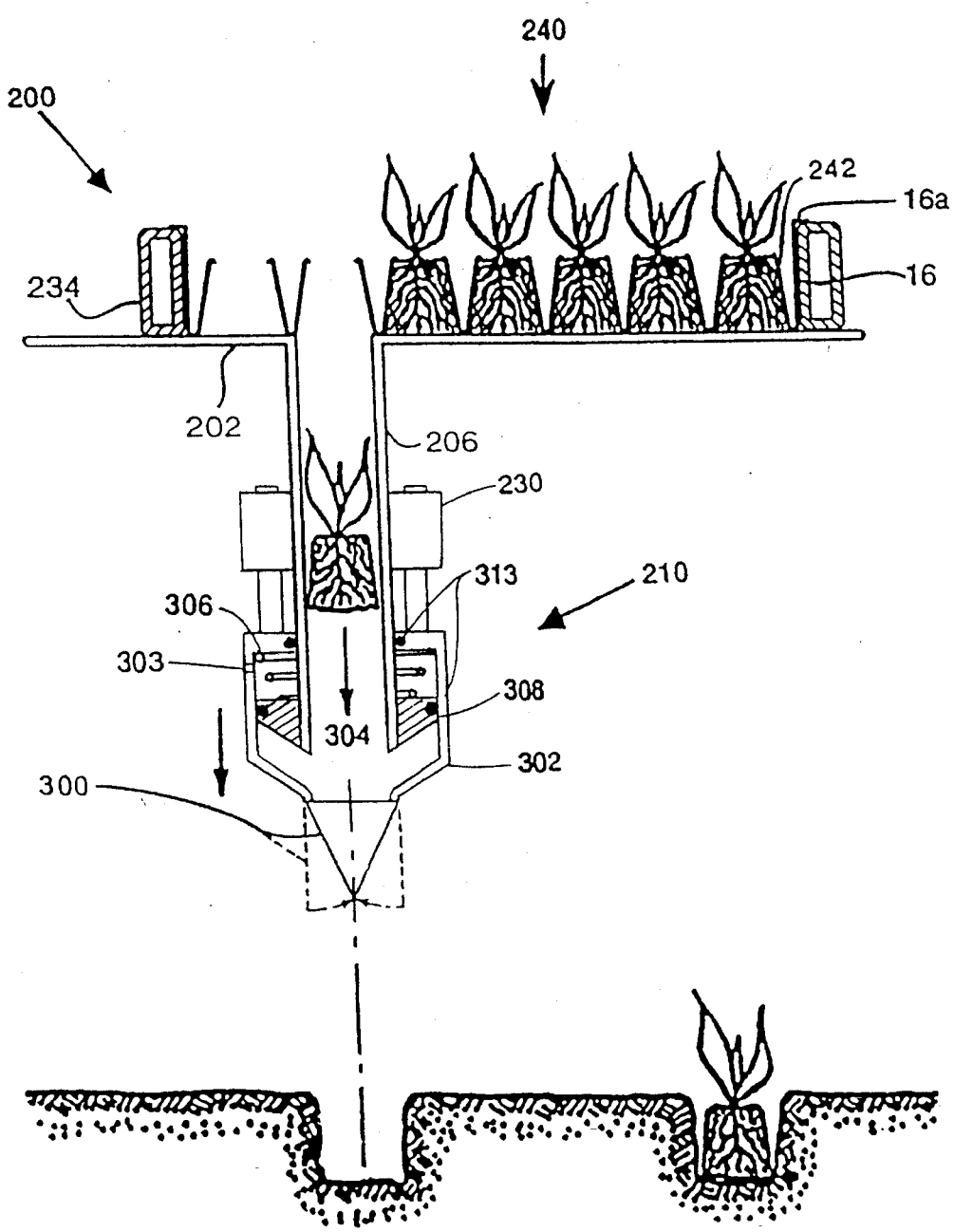

Now turning to the impulse type vacuum system shown in Figure 12, it also includes a cylindrical housing 302 that is vertically secured to the lower portion of the drop tube 206, with the inside of the lower portion of housing 302 open to the interior of the drop tube 206 by an opening 304. The piston assembly 210 includes piston plates 308 with air-release grooves 303 and O-ring 313 to form an airtight chamber in the lower portion of the piston as shown in FIG. 12. The O-ring 313 is movable between lower and upper piston plates 308. A mechanical actuating device, air cylinder, or electric solenoid 230 is mounted at the top of housing 302 and is connected to the piston plates 308. The solenoid is actuated in a synchronized time relationship with the movement of the plant tray 240 that is disposed over the drop tube 206. As the solenoid 230 pulls the piston plates 308 upward, the lower piston plate 308 makes contact with O-ring 313 to effectuate an air-tight seal, creating vacuum in the drop tube 206, causing the plant to be pulled or induced downwardly from the tray cell 242. As the solenoid 230 is deactuated, gravitational return of piston and plunger forces the upper piston plate 308 to contact with 0-ring 313, exposing the air-release grooves or openings 303 to release the air in the drop tube to facilitate returning of piston plates 308 to the initial position. Once the next succeeding tray cell 242 is properly aligned over the drop tube opening 204, the plant transfer system is ready to dispense another seedling or plant.

Turning to FIG. 12A, there is shown therein an intermittent or impulse vacuum arrangement which combines the basic concept illustrated in FIGS. 9 and 12, and particularly a reciprocating cylinder type impulse vacuum system. With respect to this embodiment, it is noted that the disclosure is essentially the same as other plant transfer and transplanting designs shown and disclosed herein. The basic difference between the embodiment shown in FIG. 12A and the other plant transfer and transplanting systems disclosed herein is that the piston assembly design of FIG. 12A generally indicated by the numeral 210 does incorporate a piston type impulse vacuum system with the piston 308 held stationary and the cylinder 302 is reciprocated to achieve the same purpose.

It is noted that the design of FIG. 12A does incorporate a plant drop tube 206 that is designed to extend from a plant tray bearing surface 202. As shown in FIG. 12A, a plant tray 240 is disposed on the plant tray bearing surface 202 and moves there across so that respective plant tray cells 242 align with the drop tube 206. Details of this basic arrangement have already been disclosed herein.

Now turning to the intermittent or impulse vacuum system 210 shown in FIG. 12A, it is seen that the same includes a stationary piston 308 (with O-ring 313 to effectuate an air-tight seal) formed about the lower remote end of the drop tube 206 and a reciprocating cylinder housing 302 that can be actuated with an actuator 230, such as, but not limited to: pneumatic cylinder(s), hydraulic or mechanical actuator(s), electric solenoid(s), or electric linear motor(s) built into the piston-cylinder assembly. The lower end of the cylinder 302 is preferably tapered downward for self-cleaning purpose and has a flexible door arrangement indicated by the reference numeral 300 as disclosed and explained in FIG. 11. The inside of the lower portion of the cylinder 302 is open to the interior of the drop tube 206 at the opening 304. This permits the vacuum system to draw a vacuum within the drop tube 206. The Reciprocally mounted cylinder assembly 302 requires a force to actuate and a force to retract the assembly 302. The forces may be derived from any number of sources including: pneumatic, electric, hydraulic, or mechanical (such as a spring).

One possible design of cylinder assembly 302 shown in Figure 12A uses an O-ring seal 313 and air release hole 303 at the upper end and a spring 306 between upper end of cylinder 302 and the stationary piston 308. The O-rings 313 maintain the cylinder in proper alignment with the drop tube 206 and effectuate an air-tight seal. The spring 306 acts to compensate for the weight of cylinder 302 and to bias the cylinder 302 to a retracted position. Another possible variation of assembly 302 is to use a double acting pneumatic cylinder actuator instead of the spring 306 so that the cylinder 302 can be returned to the retracted position pneumatically using pressurized air from the air release hole 303.

It is appreciated that the actuator 230 will be actuated to move the cylinder 302 downwardly in a synchronized time relationship with the movement of the plant tray 204 that is disposed over the drop tube 206. This impulse type vacuum will instantly dislodge the seedling block from the tray cell 242, and the acceleration and momentum of seedling block cause the seedling block to be pulled or induced downwardly from the tray cell 242, through the drop tube 206 and cause the seedling block to shoot through the door 300 to make the transplanting.

Once the next succeeding plant tray cell 242 is properly aligned over the drop tube 206 and the transplanting system is ready to dispense another plant, the piston-cylinder type impulse vacuum system 210 of FIG. 12A is once again actuated so as to induce another plant downwardly through the plant drop tube 206. It is appreciated that various piston-cylinder type designs can be incorporated to yield an intermittent or impulse vacuum producing arrangement.

Turning to FIGS. 12B, there is shown therein an impulse vacuum arrangement and particularly a reciprocating-cylinder with integrated elastic stationary piston type vacuum system. With respect to this embodiment, it is noted that the disclosure is essentially the same as other plant transfer designs shown and disclosed herein. The basic difference between the embodiment shown in FIG. 12B and the other plant transfer system disclosed herein is that the design of FIG. 12B does incorporate elastic piston which is directly connected and sealed at the end of cylinder housing and the cylinder is activated reciprocatingly with an actuating arm.

It is noted that the design of FIG. 12B does incorporate plant tray 240, bearing plate 202, plant drop tube 206 and flexible door arrangement 300. Details of the basic arrangement have already been disclosed herein.

Now turning to the impulse type vacuum system generally shown by the numeral 210 in FIG. 12B, it is seen that the same includes a housing 302 that is secured to the drop tube 206 through elastic piston sealed about the lower portion of the drop tube. The inside of the housing 302 is open to the interior of the drop tube 206 by an opening 304. This permits the vacuum system to draw a vacuum within the drop tube 206. Actuating arm 306 is attached to the lower portion of the cylinder housing 302 at the flexible door through sliding pin joint so that reciprocal actuating motion of the actuator 230 is transformed into up-and-down motion of the housing 302 to generate impulse vacuum within the housing. It is appreciated that the actuator will be actuated in a synchronized time relationship with the movement of the plant tray 240 that is disposed over the drop tube 206. Essentially, just prior to the dislodging of a plant from the tray cell, the vacuum system 210 is actuated to create a vacuum within housing 302 and this impulse vacuum is effectively transmitted to the interior of the drop tube 206 which causes the plant to be dislodged or induced downwardly from the plant tray 240, through the drop tube 206 and through the door structure 300. Once the next succeeding plant cell is properly aligned over the drop tube 206 and the plant transfer system is ready to dispense another plant, the impulse vacuum system 210 of FIG. 12B is once again actuated so as to induce another plant downwardly through the plant drop tube 206.

Now turning to the impulse vacuum system 210 shown in FIG. 12C, it is seen that the device has the same housing arrangement as shown in FIG. 12B except the reciprocating cylinder housing 302 is actuated with an actuator 230 directly mounted on the linkage mechanism 306 to form an impulse vacuum system assembly indicated generally by the numeral 210. It is appreciated that various linkage mechanism designs can be incorporated to yield an intermittent or impulse vacuum producing arrangement.

In lieu of the vacuum systems disclosed in this invention, it should be pointed out that the plant transfer and transplanting system of the present invention could be provided with a pressure chamber that would be disposed above the plant tray and would exert a downward force on the plants and as such, would provide the force for dislodging, directing or inducing the respective plants/plugs from the plant tray cells.

Figure 13:
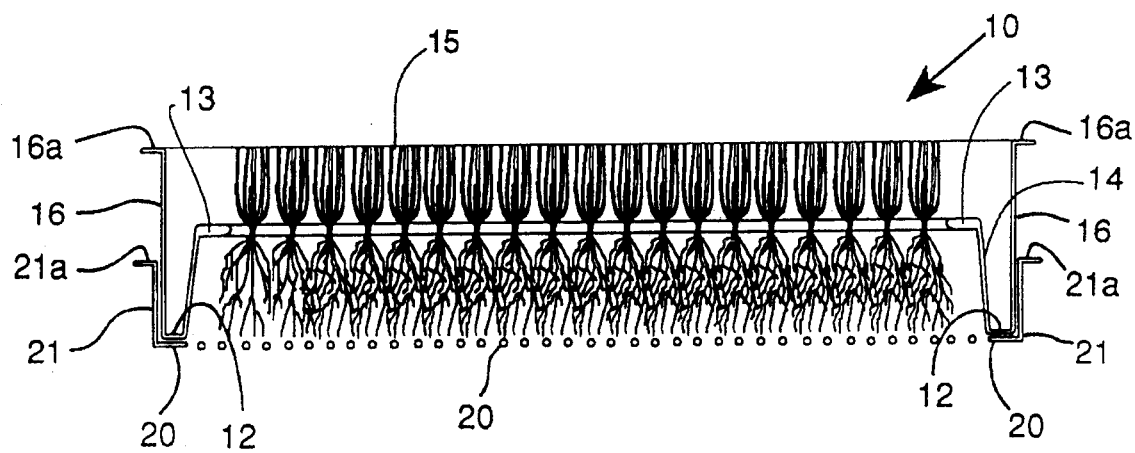
FIG. 13 is a cross-sectional view of a plant tray of the present invention utilized to grow a continuous strip of sod.
Figure 14:
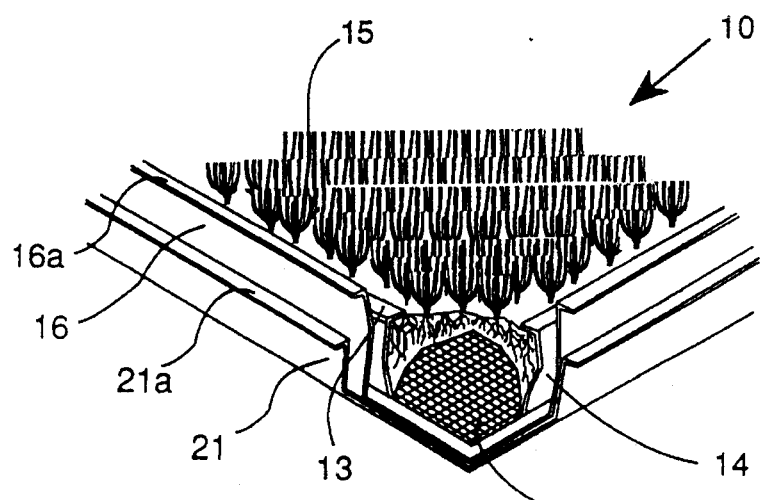
FIG. 14 is a fragmentary perspective view of the plant tray illustrated in FIG. 13 showing the plant tray holding an area of sod with a portion of the sod and its plant growing medium being cut away to better illustrate the entire tray structure.

Turning to FIGS. 13 and 14, it is seen therein that the plant tray 10 of the present invention is designed and adapted to accommodate the growing of sod, indicated by the numeral 15, under air-pruning conditions. Essentially, the plant tray 10 of the present invention in the embodiment illustrated in FIGS. 13 and 14, forms one relatively large growing cell that is occupied by a continuous layer of sod. In order to accommodate the sod 15, the tray is designed to accept a plant growing medium in the form of a piece of foam, styrofoam or the like or any other suitable plant growing medium such as discussed herein before. But in the case of sod, it has been found that a porous lightweight material such as organic form (such as peat impregnated form) or nonorganic foam, styrofoam, etc., both in mat, strip or cut form makes for a quality medium.

In the planting operation, the plant growing medium such as a foam strip or mat is laid over the bottom of the detachable screen 20 and is confined within the sides 16 of the tray. Thereafter, the seed is uniformly spread over the plant growing medium and thereafter the tray and plant growing medium is treated in conventional fashion. The seeds will germinate and thereafter a root structure will extend downwardly through the porous lightweight organic or nonorganic form, or styrofoam material (or other medium) and because of the presence of the screen an air-pruning effect will be achieved such as illustrated in FIG. 13. The grass or upper portion of the sod will extend up from the plant growing medium as illustrated in FIG. 13. The grass can be mowed at the level of tray edge 16a for uniform and vigorous growth.

Once the grass or sod has matured, the screen 20, as has been described herein before, is removed from the tray 10. Next, the sod 15 including the plant growing medium and plant root system is grasped and removed from the plant tray. It should be appreciated that this produced sod can be easily handled and transplanted automatically because of the nature and construction of the plant growing medium and particularly a plant growing medium such as a lightweight porous foam material. It is appreciated that once the sod is planted on a ground or earth surface that the lightweight porous foam-type material will, over time, break down and disintegrate into the earth and become a part thereof.

From the foregoing specification and discussion it is appreciated that the present invention entails a plant tray system that lends itself to air-pruning and automated transplanting but yet is provided with a bottom detachable screen that assists in confining and holding the plant growing medium within the plant tray structure. The air-pruning tray becomes part of automatic transplanting system and sod plugs, strips, or mats are effectively and efficiently pulled out and transplanted using continuous, intermittent or impulse vacuum system, or other physical means with the basic operation.

The present invention may, of course, be carried out in other specific ways than those herein set forth without parting from the spirit and essential characteristics of the invention. The present embodiments are, therefore, to be considered in all respects as illustrative and not restrictive, and all changes coming within the meanings and equivalency range of the appended Claims are intended to be embraced therein.

What is claimed is:

1. A plant transfer system:
    a) a plant tray support for receiving a plant tray and wherein the plant tray support includes an opening formed therein for permitting a plant from the plant tray to pass from the plant tray through the opening within the plant tray support;
    b) a plant drop tube extending from the opening within the plant tray support; and
    c) an impulse and intermittent pressure source for periodically inducing a plant from the plant tray, through the opening within the plant tray support, and through the plant drop tube into an underlying planting area.

2. The plant transfer system of claim 1 wherein the pressure source comprises a vacuum source.

3. The plant transfer system of claim 2 wherein the vacuum source generates an impulse and an intermittent vacuum in the drop tube which induces a plant from the plant tray downwardly through the opening within the plant tray.

4. The plant transfer system of claim 3 wherein the vacuum source includes an outer housing and an internal piston and an actuator for creating relative movement between the piston and the housing and wherein the relative movement generates a vacuum that is communicated to the drop tube which in turn induces a plant from the plant tray downwardly through the opening within the plant tray support and into and through the drop tube.

5. The plant transfer system of claim 4 wherein the housing and the piston of the vacuum source surround a respective drop tube.

6. The plant transfer system of claim 5 wherein the housing is communicatively open to the drop tube and wherein the piston is stationarily mounted on the drop tube while the housing is movably mounted with respect to both the piston and the drop tube and is connected to the actuator which is operative to move the housing up and down with respect to both the stationary piston and the drop tube wherein the selected movement of the housing with respect to the stationary piston is effective to generate an impulse vacuum that is communicated to the drop tube which is in turn operative to induce a plant from the plant tray through the opening within the plant tray support.

7. The plant transfer system of claim 4 wherein there is provided an O-ring extending around the piston and wherein the O-ring engages an inside wall of the housing so as to create a relatively airtight seal between the piston and the housing.

8. The plant transfer system of claim 7 wherein the actuator is operative to move the piston back and forth within the housing so as to selectively create an impulse vacuum and an intermittent vacuum and wherein the housing is communicatively connected to the drop tube such that the impulse vacuum when created is present within the drop tube so as to induce a plant from the plant tray downwardly through the opening within the plant tray support into the drop tube.

9. The plant transfer system of claim 8 wherein the piston includes at least one sealable opening which is open during a selected stroke of the piston to allow air to pass therethrough and move from one side of the piston to the other side of the piston.

10. The plant transfer system of claim 9 wherein the O-ring extended around the piston moves along the side of the piston in response to the piston being extended and retracted within the housing and wherein during one stroke of the piston the O-ring tends to seal the opening within the piston and during another stroke of the piston the O-ring is spaced so as to leave the opening open such that air can pass from one side of the piston to another side of the piston.

11. The plant transfer system of claim 4 wherein the housing is communicatively connected to the drop tube for communicating a vacuum from the housing to the drop tube and wherein there is provided a flexible and extensible diaphragm connected to the piston and which moves back and forth with the piston as the piston is extended and retracted during the process of creating an impulse and an intermittent vacuum.

12. The plant transfer system of claim 3 wherein the drop tube includes a lower remote end and wherein the lower remote end of the drop tube includes a flexible door arrangement that will close tight in response to a vacuum created in the drop tube thereby causing a plant to be ejected downward and to shoot through the flexible door arrangement to effectuate transplanting.

13. The plant transfer system of claim 1 wherein there is provided a pair of pivotally mounted cooperating doors secured about an outlet end of the drop tube and at least one connecting link extending between the doors such that the doors can be simultaneously opened and closed by a single actuation; and wherein there is provided means for sensing the presence of a dropping plant and for actuating the doors so as to open the same in response to a downwardly dropping plant approaching the doors and for also closing the door structure once the respective plant has moved past said door structure.

14. The plant transfer system of claim 1 wherein there is provided an air jet disposed about an outlet end of the drop tube and wherein the air jet provides an air curtain seal about the outlet end of the drop tube which tends to assist in the ejection of the plant from the plant tray.

* * * * *